United States Patent [19]

Durney

[11] 4,022,370
[45] May 10, 1977

[54] DUAL IN-LINE CHIP EXTRACTOR-EXCHANGER APPARATUS

[75] Inventor: David John Durney, Holland, Pa.

[73] Assignee: Burroughs Corporation, Detroit, Mich.

[22] Filed: Apr. 30, 1976

[21] Appl. No.: 682,098

[52] U.S. Cl. .............................. 228/5.1; 219/85 D; 219/85 BA; 228/6 A; 228/20; 228/191

[51] Int. Cl.² ...................... B23K 1/20; H05K 3/34

[58] Field of Search ............... 228/4.5, 5.1, 13, 19, 228/6 A, 20, 21, 191, 264, 227, 230, 51; 29/625, 626, 203 B; 219/85 D, 85 BA

[56] References Cited

UNITED STATES PATENTS

| 3,230,338 | 1/1966 | Kawecki | 219/85 D |
|---|---|---|---|
| 3,382,564 | 5/1968 | Gallentine | 228/20 X |
| 3,644,980 | 2/1972 | Class | 228/20 X |
| 3,731,866 | 5/1973 | Mason | 228/19 X |
| 3,735,911 | 5/1973 | Ward | 228/19 |
| 3,742,181 | 6/1973 | Costello | 219/85 BA |
| 3,804,320 | 4/1974 | Vandermark | 228/19 |
| 3,842,478 | 10/1974 | Schreckeneder | 29/203 B |

*Primary Examiner*—Al Lawrence Smith
*Assistant Examiner*—Nicholas P. Godici
*Attorney, Agent, or Firm*—Carl Fissell, Jr.; Edward J. Feeney, Jr.; Kevin R. Peterson

[57] ABSTRACT

Apparatus for removing and replacing dual in-line solid state circuit chip devices and/or receptacles or sockets from printed wiring or circuit (PC) boards comprising means for positioning a printed wiring board adjacent to a source of radiant energy capable of soldering and desoldering said devices, means for automatically, cyclically extracting a device from said board and replacing said device with another similar device, means forceably removing the excess solder residue retained by the board when the device is extracted, means for automatically timing both the device extraction and insertion and the soldering and desoldering operation, and means preventing device extraction should the desoldering operation fail to release the device from the PC board.

10 Claims, 12 Drawing Figures

DUAL IN-LINE CHIP EXTRACTOR-EXCHANGER APPARATUS

FIELD OF THE INVENTION

The invention has to do with the fabrication of printed circuit boards wherein solid state dual inline chip devices (DIPs) or sockets are or may be inserted therein or removed therefrom as circuit changes manifest themselves or in those instances in which a faulty circuit device must be replaced with a new unit.

BACKGROUND OF THE INVENTION

Modern data processing apparatus more and more frequently relies upon solid state devices to perform the multitudinous functions requried to process, store, utilize and retrieve information and data relative to business science and associated technologies. The printed circuit board and the dual in-line solid state circuit chip (DIP) have been married to produce a wide variety of useful data processing progeny, e.g., memory storage banks, central processor, oscillators, amplifiers, etc. The chips are, for the most part, fastened to the printed wiring board by rows of pins which are press fit into mating holes located in rows and columns on the surface of the printed circuit board.

Attachment techniques vary from manufacturer to manufacturer but they generally involve at least a printed wiring pattern and one or more multicontact chips. Each chip must be inserted into the wiring pattern and thereafter permanently secured therein. Solder is the most commonly used attachment medium and is applied by hand, or by means of solder machines or some combination of the two. Certain of the contacts of each chip may be bent or angularly oriented with respect to the printed circuitry effective to retain the chips for presentation to the solder stage of the fabrication technique being utilized. Thereafter the chips ar permanently bonded in place and the circuit board is than ready for use.

Assuming no change in circuitry, or no failure of solid state chips, the foregoing is sufficient. However, should it be required or necessary for one reason or another to remove a chip and/or insert a replacement chip, a host of problems immediately present themselves.

A previous method for removing a chip component involved a heated plier type tool which gripped the chip for manual removal thereof from the board which action often cracked the board, dislodged the printed wiring pattern adjacent to the chip reception area or indeed, in some instances, severed one or more chip leads due to the forces required to detach the component from the board. Another method heated the bottom side of the printed wiring board with a pool of molten solder. Thereafter the operator utilizing a cold plier type tool pulled (from the top) the heat loosened chip from the board. This latter method often destroyed the board due to over-heating, loosened the adjacent printed wiring pattern and/or ruined the printed circuitry by premature pulling of the chip if the chip leads hadn't been sufficiently loosened by the applied heat.

SUMMARY OF THE INVENTION

The present invention solves the foregoing and other problems in a unique, novel, unobvious and heretofore undisclosed manner. Apparatus embodying the invention is of the semi-automatic type including both time and temperature control. The printed circuit board is heated simultaneously from both sides in the vicinity of the chip attachment leads thereby preventing one side from being overheated. The chip is prevented from being extracted from the board until a predetermined time and temperature has been reached. Thus, should the attaching solder not be molten sufficiently to release the chip from the board, the extract or pull cycle will not be activated.

The apparatus is capable of performing its functions in two different manners: one is to extract the component from the board concurrently removing excess attachment solder and the other is to remove a component and insert a fresh one in its place. Adjustment is provided in order to accommodate varying widths and lengths of components (chips).

The invention comprises a base structure supporting a flat table like member upon which the printed circuit board is slideably received. A lower radiant heating unit is focused into and through an opening in the table over wich the chip bearing printed circuit board is positioned so as to bring the heat rays into contact with the solder attachment areas. An upper heater means is slideably positionable normal to the chip and the table and carries a demountable-rotatable chip pulling inserting mechanism. A rockable linkage interconnecting the heater mechanism and a detachable solder removal mechanism is effective to cause the chip pulling apparatus to remove a damaged chip and insert a new chip or to remove a chip and concurrently remove the solder residue by forced air pressure. Electrical switch and solenoid control members provide timing means for the apparatus effective to prevent the removal of a chip if the time-temperature pattern is not completed in accordance with the prearranged schedule.

DETAILED DESCRIPTION OF THE INVENTION

Figure 1:
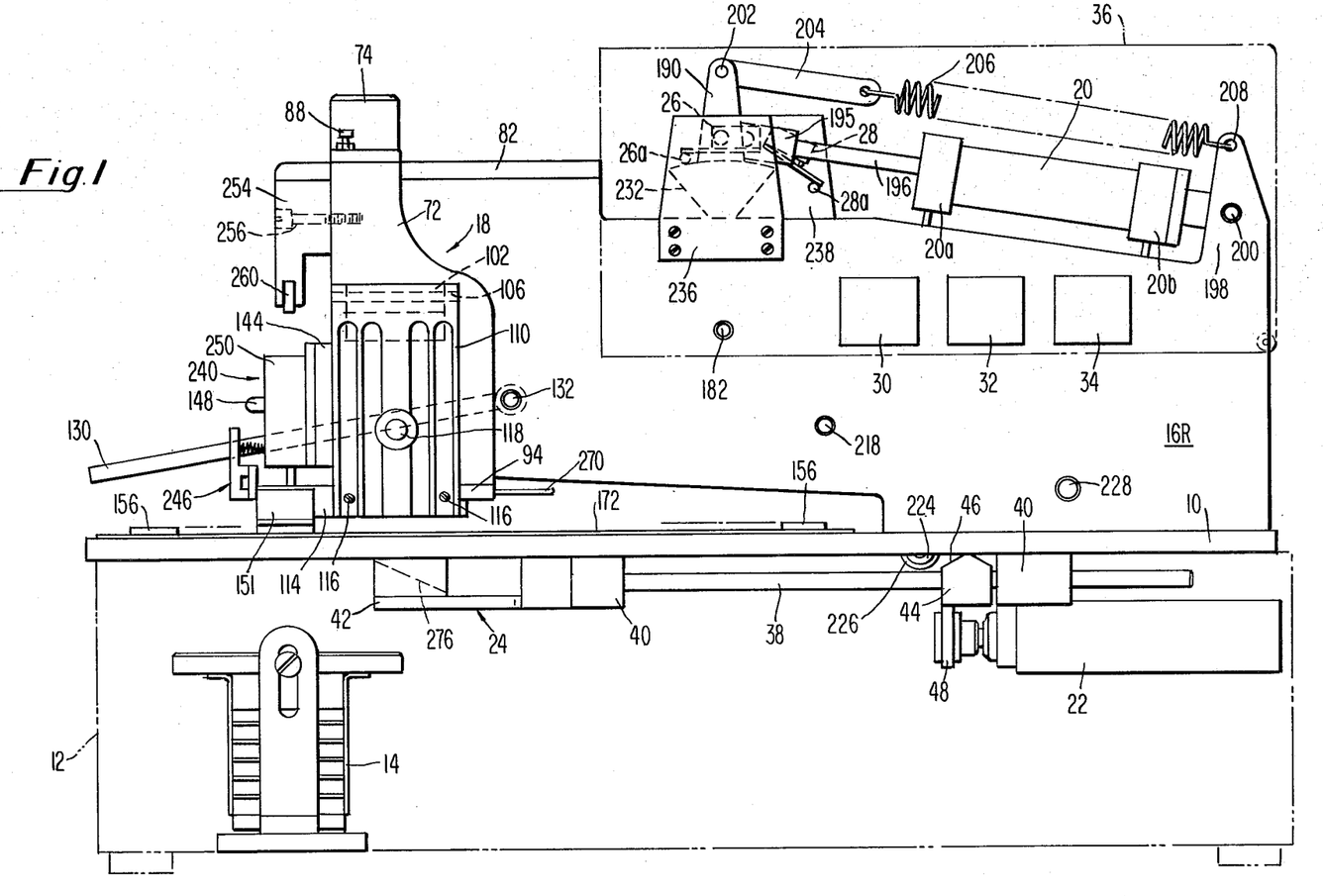
FIG. 1 is a side elevational view of apparatus embodying the present invention.

The present invention is a semi-automatic dual-in-line package extractor-inserter, solder remover. As seen first in FIG. 1 of the drawings, the invention comprises a flat bed or table member 10 mounted in conventional fashion to a base support 12 which is fabricated in the form of a hollow, shallow, rectangular assembly. Within member 12 is located an adjustable source of high heat radiant energy 14 secured to the base support member. Supported between adjacent left and right parallel side wall members 16L and 16R, only on of which is seen in FIG. 1, is a chip pulling-extractor-inserter solder removing mechanism 18 which will be described in greater detail shortly herein. An extract-insert-hydraulic ram 20 is disposed at the upper right hand (rear) portion of the apparatus for purposes to be described presently. A solder-blower-deflector hydraulic ram 22 is disposed beneath and attached to the bed or table 10 and is utilized to actuate the solder deflector slide member 24 in a manner and for purposes still to be described. A pair of electrical cam actuated switches 26 and 28, FIG. 4, mounted to adjacent side wall members 16L and 16R respectively, control the chip insertion, solder removal and the return of the apparatus to the home or starting position. Three control relays 30, 32 and 34, supported adjacent to the outer side wall 16R on an arcuately retractably hinged shroud member 36 are adapted to control various functions of the apparatus in accordance with the electrical circuit diagram, FIG. 12, as will be described later on herein.

Figure 2:
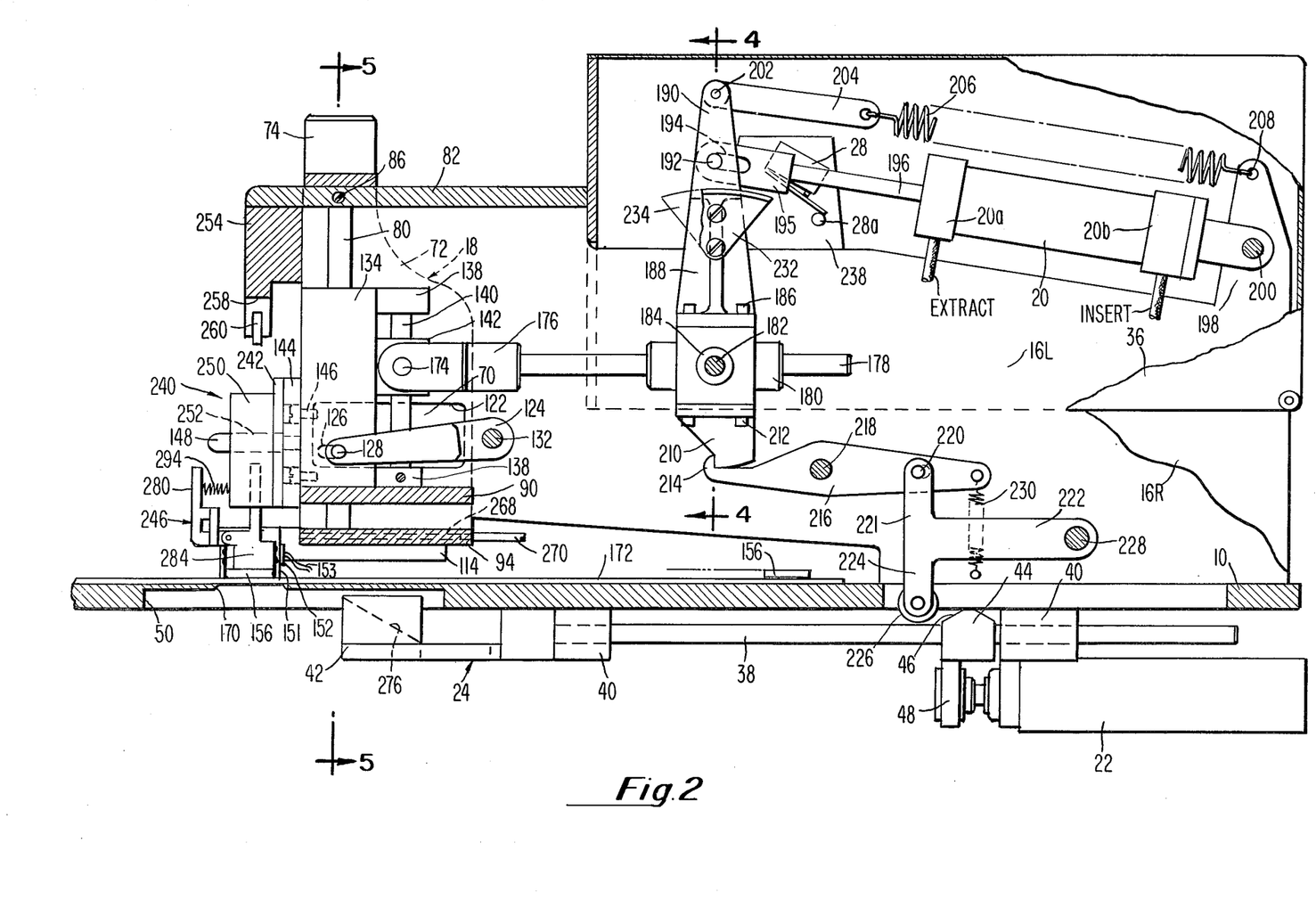
FIG. 2 is a side elevational view partially in section of the apparatus of FIG. 1 with the facing side wall member removed to expose the interior thereof.
Figure 3:
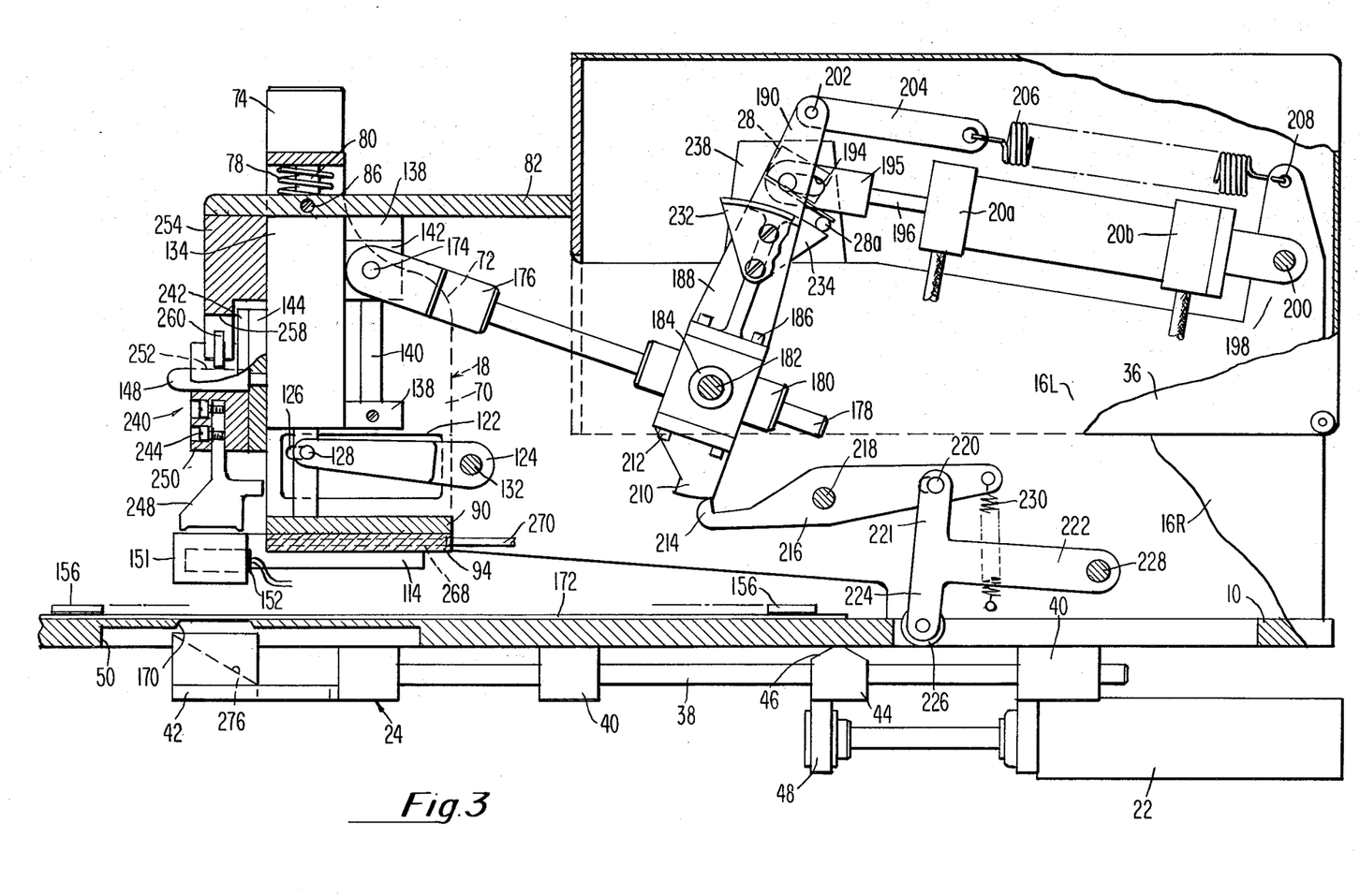
FIG. 3 is a view similar to FIG. 2 but with the apparatus moved to a different position.

As seen in FIGS. 1, 2 and 3, a pair of elongated push rods 38—38 (only one of which is shown) are mounted to the lower surface of member 10 in slideable relation thereto by means of front and rear bearing blocks 40—40. The forward (leftward, FIG. 2) end of rods 38—38 carries a solder deflector member 42, the operation of which will be explained presently. The rearward (rightward, FIG. 2) portion of rods 38—38 carries a cam member 44, angled as at 46, while the lower or opposite portion thereof is secured to and moves with the plunger member 48 of ram 22. Member 42 is slideably movable back and forth in a cut-out 50 of table 10. In the retracted, start or home position (FIG. 2) the rightward end of member 42 abuts front member 40.

Figure 6:
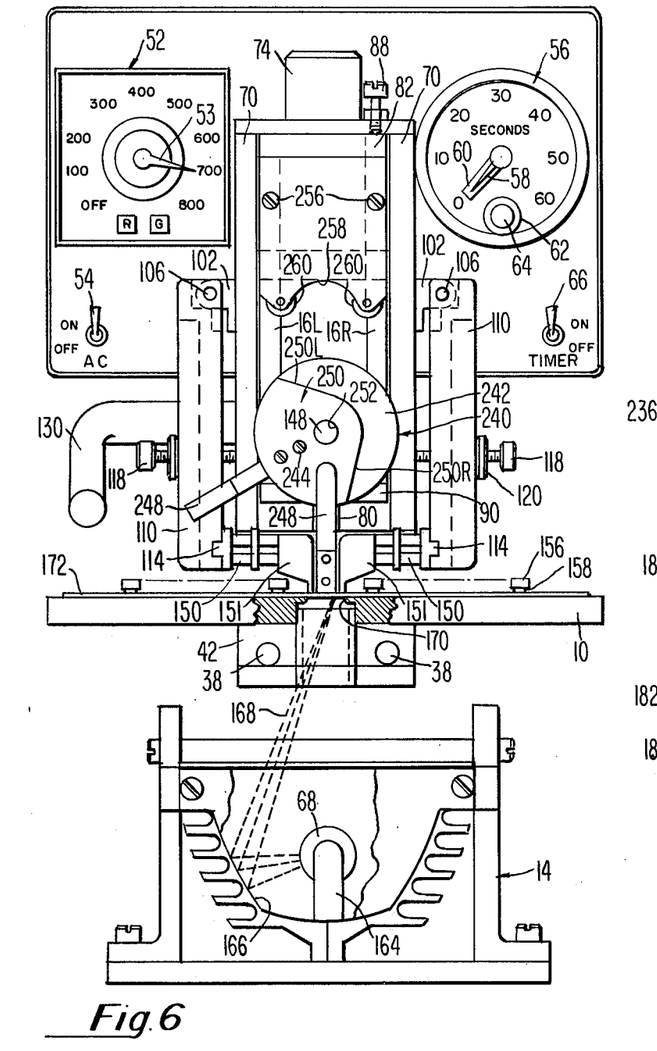
FIG. 6 is a front elevational view of the present invention illustrating the time and temperature controls therefore.

In the front elevational view of FIG. 6 the apparatus embodying the present invention is seen to include proportional temperature control 52 having a dial indicator 53 which is rotatably settable by hand to the desired temperature. The temperature range is adjustable from 0° to 300° F in approximately 20° increments. A red indicator light signals that the unit is not up to the desired heat while a green indicator light indicates that the heat has been reached and stabilized. An on-off switch 54 acts to energize the heater units (still to be described) and apply suitable voltage levels to the remainder of the apparatus as shown in the schematic diagram of FIG. 12, which, as aforementioned, will also be described later on herein.

To the right of the temperature control unit 52 is a temperature timer 56. A pair of coaxially mounted rotatably dial members 58 and 60 together with the hand set wheel 62 provide means to set the time. Push button switch 64 energizes and de-energizes the associated radiant heater lamp 68 of unit 14. An on-off switch 66 places the timer in circuit as needed.

Figure 5:
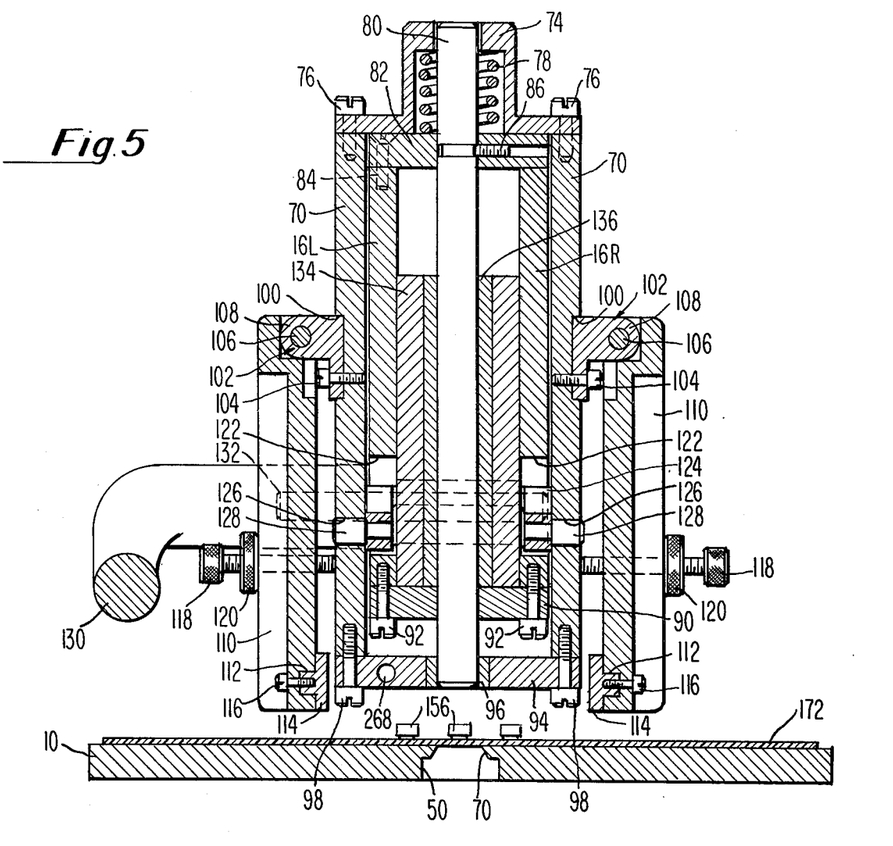
FIG. 5 is a sectional view along the line 5—5 of FIG. 2.

The chip inserter-remover 18 comprises a pair of opppsitely disposed rigid, upright, parallel support members 70—70, FIGS. 5 and 6. The upper narrow portion 72, FIGS. 1 and 2 of members 70—70 carries an inverted circular cup-shaped receptacle 74 secured to the ends of members 70—70 by bolts 76. Member 74 provides a retainer for a coiled spring 78 which surrounds the upper end of an elongated shaft or rod member 80. Spring 78 is seated on a cover member 82 which spans the space between fixed vertical wall members 16L and 16R to which the cover is attached by bolts 84. Shaft 80 is secured against movement by means of a set screw 86, the latter projecting through cover 82 into and through shaft 80. An over-travel adjustment screw 88, FIG. 6, provides a lower limit for the chip inserter-remover for purposes to be described presently.

The lower end portion of shaft 80 passes through a bottom side wall attachment member 90 secured to the bottom forward end portion of side wall members 16L and 16R, as by bolts 92 (FIG. 5). Shaft 80 terminates at its lower end in a rigid plate member 94 carrying a bearing member 96, member 94 being secured to the lower ends of members 70—70 by bolts 98. The outer face of each member 70 is provided with a rectangular indentation 100, as by milling, into which a hinge forming support member 102 is received and affixed thereto by bolts 104. A pivot pin 106, passing through the upstanding tabs 108 projecting from each member 102, pivotally supports a fluted, heat sink member 110 at opposite sides of the apparatus. The lower inside edge portion of member 110 is grooved, as at 112, to receive a T-shaped elongated bar member 114, attached thereto by bolts 116, for purposes to be described later on herein. Heat sinks 110—110 are adjustably positionable about the pivot pins 106—106 by means of knurled adjustment screws 118 and locking nuts 120, for purposes to be described more fully hereinafter.

Side wall members 16L and 16R are each provided with a rectangular opening 122 therein, as seen in FIGS. 2, 3 and 5, to provide clearance for the vertical, arcuate movement of the forward end of a horizontally disposed yoke member 124. Each side wall member 70—70 is provided with a short horizontally elongated cam slot 126 therein, as seen most clearly in FIGS. 2 and 3, for receiving the oppositely disposed follower roller 128 secured to the forward end of yoke member 124 (leftward in FIGS. 2 and 3). The rearward (rightward in FIGS. 2 and 3) end of yoke 124 carries an elongated irregularly shaped handler member 130 (FIGS. 1 and 5) mounted thereto by means of the horizontally disposed attachment pin 132 projecting into and through a portion of handle 130 (FIG. 5).

Yoke 124 is arranged so that it's forwardly extending parallel arms straddle a vertically movable block like member 134 adapted to move or ride on coaxial bearing 136 (FIG. 5), up and down, on fixed shaft 80. The rearward (rightward in FIGS. 2 and 3) portion of member 134 is provided with integral projecting bearing members 138—138 mounting a vertical cross shaft 140 carrying a slideable bearing block 142, for purposes to be described presently herein.

As seen most clearly in FIG. 2, but also in FIGS. 1 and 3, block member 134 is provided with a circular mounting plate 144 attached to the front or leftward side thereof as by bolts 146. A forwardly (leftwardly in FIGS. 1, 2 and 3) projecting mounting shaft or stud 148 is threadedly secured to member 144 and is adapted to demountably receive in press fit relation thereto one of the various insertion-extractor and/or desoldering tools for which the present apparatus is constructed, as will be described shortly herein. Member 144 is moveable with member 134 in a manner to be explained shortly herein.

The present invention is employed as a semiautomatic means for extracting and replacing defective D-I-P chips from a printed wiring circuit board and/or desoldering the chips and physically removing the solder or attachment residue by means of compressed air. To this end, it is at once apparent that means must be provided to melt the solder which is used to attach the chips to the PC board in the first instance and for resoldering or melting the solder residue when a new component is attached to the PC board.

Since the solder often extends into and through the printed circuit board mounting holes, an upper and a lower heating unit is emplyed to adequately distribute the heat effective to melt the solder surrounding the component. However, due to the nature of the material used in fabricating the PC boards, heat sufficiently high to melt the solder may also burn the PC board and disrupt the printed wiring harness thereon, disrupting the functional aspect of the wiring and often fracturing the board to make it useless. The present invention avoids these problems by utilizing two different types of heater units as will now be explained.

Figure 11:
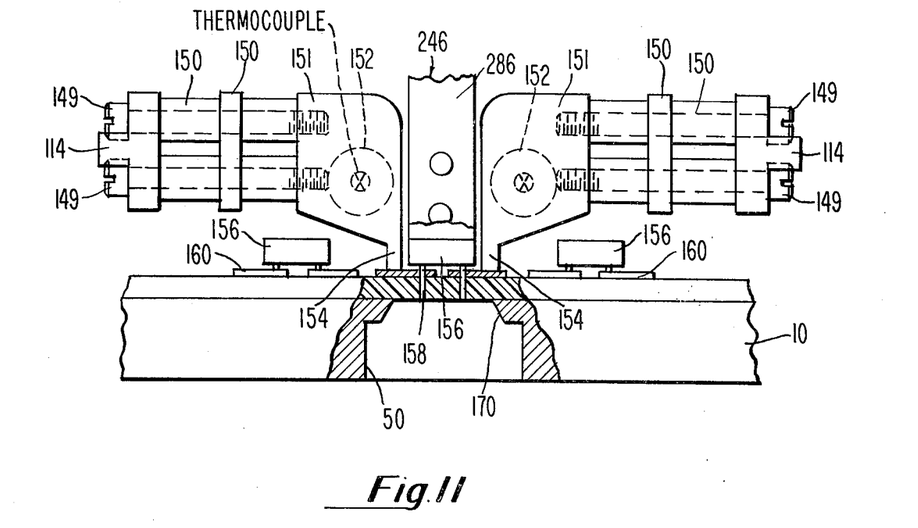
FIG. 11 is a greatly enlarged sectional detail view of the upper heater elements and the size adjustment means of the present invention.
Figure 12:
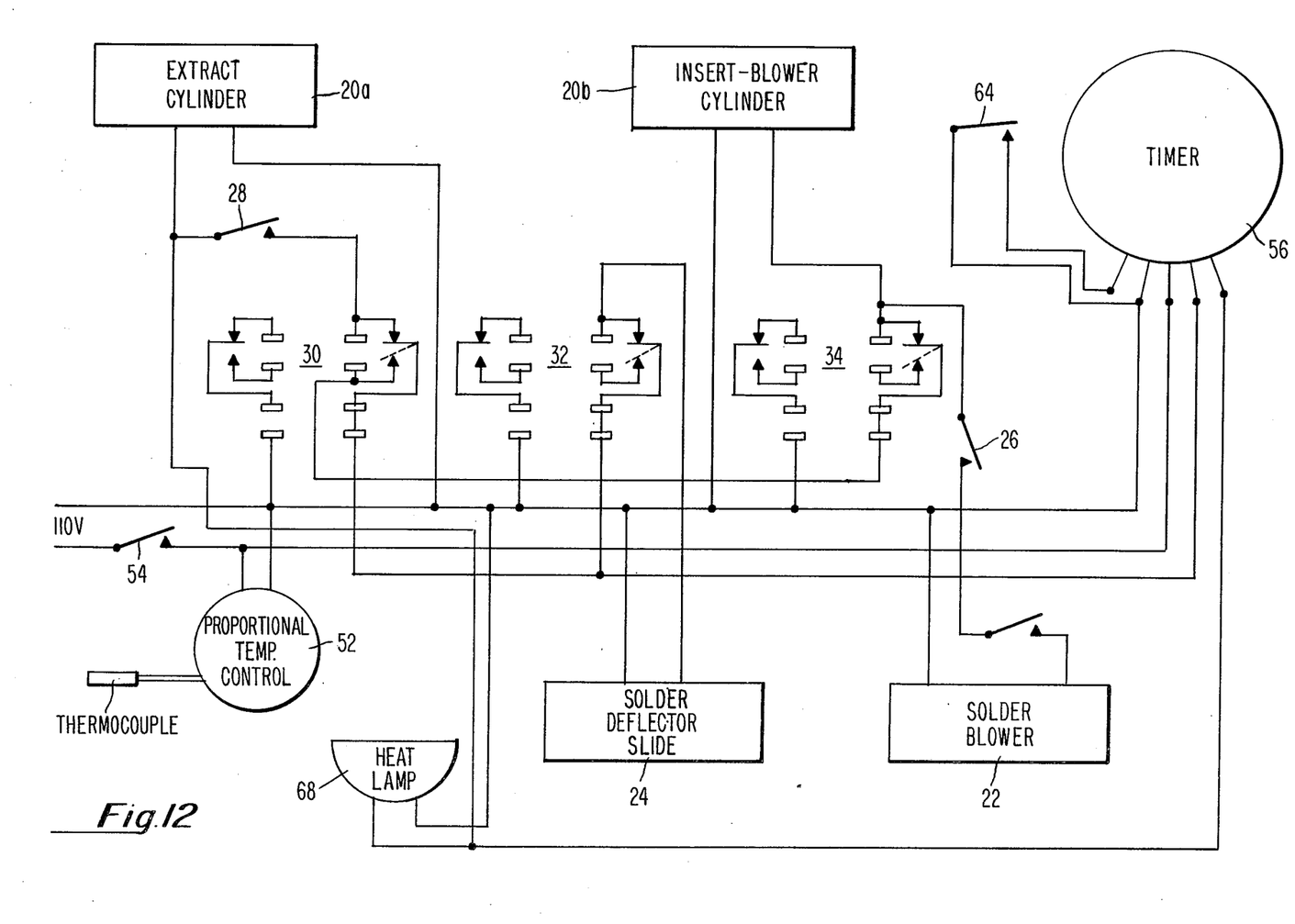
FIG. 12 is an electrical circuit diagram illustrating the various electrical controls employed with the present invention.

Secured to each of the T-bar members 114—114 (FIG. 11) by means of threaded rods or bolts 149 and spacers 150 are oppositely disposed electrical heater head members 151—152 are disposed centrally of the members 151 and are energized over leads 153, FIG. 3, by means of the circuitry of circuit diagram, FIG. 12. The lower edge portion of each heater member 151 is configured and shaped to provide a depending projection 154 with the two head pair being adapted to straddle a chip 156 (FIG. 9) adjacent the chip leads 158 (FIGS. 10 and 11) so as to rest on the PC pad area 160 effective when energized to free the attachment material by melting it thereby to free the D-I-P component.

Located beneath table 10 at the forward end thereof, FIGS. 1 and 6, is the earlier referred to high heat radiant energy member 14 comprising an iodine vapor lamp 68 (FIG. 6) positioned in a holder 164 located at the focal point of a vertically, adjustably, positionable parabolic reflector 166. The reflected rays 168 of lamp 68 are brought to focus through a rectangular aperture 170 in member 10 against the underneath side of a printed circuit board 172. Application of suitable potential to the lamp 68 from the source as shown in FIG. 12 will cause the solder attachment material to melt, freeing the chip contacts so that the chip may be easily extracted or withdrawn from the PC board 172.

Referring next to FIGS. 2 and 3 (but also in part to FIG. 1) it is seen that bearing block 142, slideable vertically up and down on cross shaft 140 of block member 134, is pivoted at 174 to a bearing yoke 176 attached to a horizontal rod 178 extending rightwardly. FIGS. 2 and 3, into and through a slide bearing 180. Bearing member 180 is rockably, pivotally mounted by means of pins 182 (FIG. 4) and bearings 184 between vertical side wall members 16L and 16R as seen in the sectional view of FIG. 4.

Figure 4:
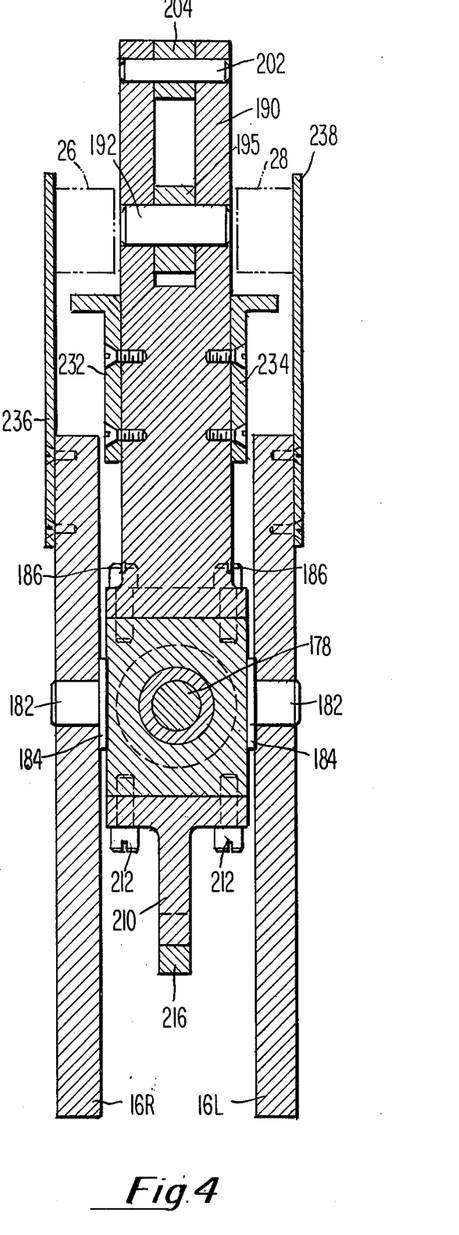
FIG. 4 is a sectional view along the line 4—4 of FIG. 2.

Secured as by bolts 186 to the top of bearing 180 is a vertical actuating arm 188 extending vertically upwardly to terminate in a yoke member 190, FIG. 4. The lower portion of yoke 190 carries a cross pin 192 secured through a slot 194 of actuator member 195 which is attached to the projecting plunger rod 196 of the double action hydraulic cylinder or ram 20, earlier referred to herein. Hydraulic ram 20 is pivotally mounted between the rear vertical projecting tabs 198—198 of wall members 16L and 16R by means of a cross pin 200. The apex of the yoke 190 carries a cross pin 202 which secures a link 204 attached to one end of a retracting spring 206. The opposite end of spring 206 is secured to a cross pin 208 of the top of tab 198.

A depending latch member 210 is secured as by bolts 212 to the lower side of bearing 180. The leftward hooked end 214 of a rockable catch link 216 engages the latch 210 when member 188 is in its vertical position as shown in FIG. 2. Link 216 is pivoted at 218 between side walls 16L and 16R. The rightward end of catch link 216 is pivotally secured at 220 to the vertical arm 221 of a T-shaped member 222. The lower dependent arm 224 of member 222 carries a cam follower roller 226 engageable with the cam 44 of ram 22. Member 222 is pivoted between side walls 16L and 16R by a pin 228. A biasing spring 230 secured to the rightward end of link 216 and wall 16L returns link 216 to the latched position after cam 44 has disengaged the latch as will be described later on herein.

Attached to the vertical, rockable member 188, as seen in FIGS. 2 and 3, but most clearly in the sectional view of FIG. 4, are two cam members 232 and 234 which are adapted to engage and actuate switch actuator arms 26a and 28a (respectively, FIG. 1) of switches 26 and 28, the latter being secured to switch supports 236 and 238 respectively, attached to left and right side walls 16L and 16R. Switches, 26 and 28, in conjunction with ram members 20 and 22 control the extracting-inserting and solder removing functions of the apparatus, as will become clear further on in the present description.

So as to provide versatility and efficiency for the apparatus embodying the present invention, there is provided a demountable tool holder 240, as seen in one or more of the views of FIGS. 1, 2, 3, 6 and 7. As shown in the front elevational view of FIG. 6, and the cross sectional view of FIG. 3, tool holder 240 comprises a circular, relatively thin, disk-like member 242 to which is secured, as by bolts 244, (in one combination of tools), a chip extractor-puller or remover member 246 (FIG. 2). Approximately 60° away therefrom on the disk 242 is attached to a desoldering tool 248 also secured to the disk by bolts 244. A relatively thick cam member 250 is secured to the disk 242, as seen in FIG. 6, and in FIGS. 1, 2 and 3. Both the cam 250 and disk 242 are drilled to provide a press fit mounting aperture 252 (FIG. 2) therethrough for demountable attachment to the projecting pin or stud 148.

Actuating means for positioning the respective tools into the various positions required to insert or remove a chip or remove the attaching solder comprises a block member 254, FIGS. 1, 2, 3 and 6, secured to the front edges of vertical wall members 16L and 16R by bolts 256. The lower edge portion of member 254 is provided with a depending radially curved portion 258, the opposite sides of which carry a separate left and right follower roller 260, engageable with the angled edges 250L and 250R of cam 250, effective as will become apparent later on herein, to rotate cam 250 to position the tool holder to one of two different angularly offset work operating positions.

Figure 8:
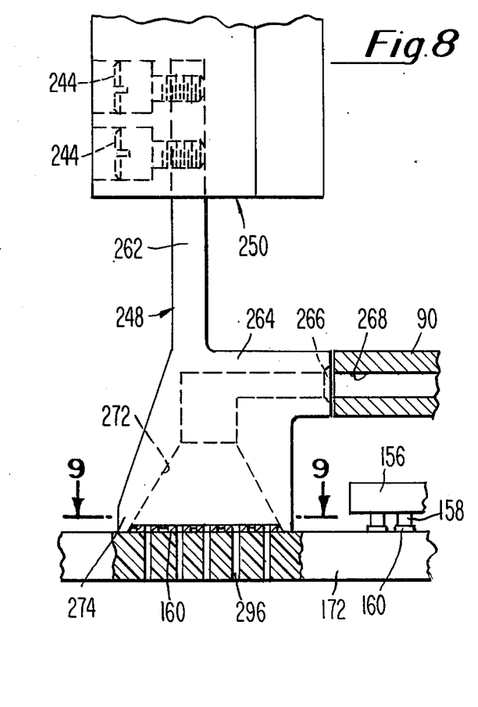
FIG. 8 is a greatly enlarged, detail view, partially in section, of the solder removal mechanism of the present invention.

Desoldering tool 248, as seen most clearly in FIG. 8, comprises an attachment member 262, drilled to receive mounting bolts 244 securing member 248 to the tool holder 250 earlier described herein. The lower portion of tool 248 includes a horizontally projecting portion 264 provided with an orifcie 266 for coaxial coupling to the air pressure outlet 268 in the lower cross member 90. Compressed air is introduced into the member 90 through an air inlet tube 270 (FIG. 3) from a source of compressed air, not shown. Orifice 266 is angled perpendicularly to the inlet opening into a truncated pyramidal shaped, hollow body portion 272 adapted to be received over a chip receiving pad area on a printed circuit board with the tabs 274 enclosing the pad area. Upon the application of heat and pressurized air forced into and through the desoldering tool 48, attachment residue, i.e., solder, will be blown out of the PC board connection holes, downwardly against the canted or angled surface 176 of deflector 42 (FIG. 3) into a solder receiving receptacle, not shown, in the interior of the apparatus.

Figure 7:
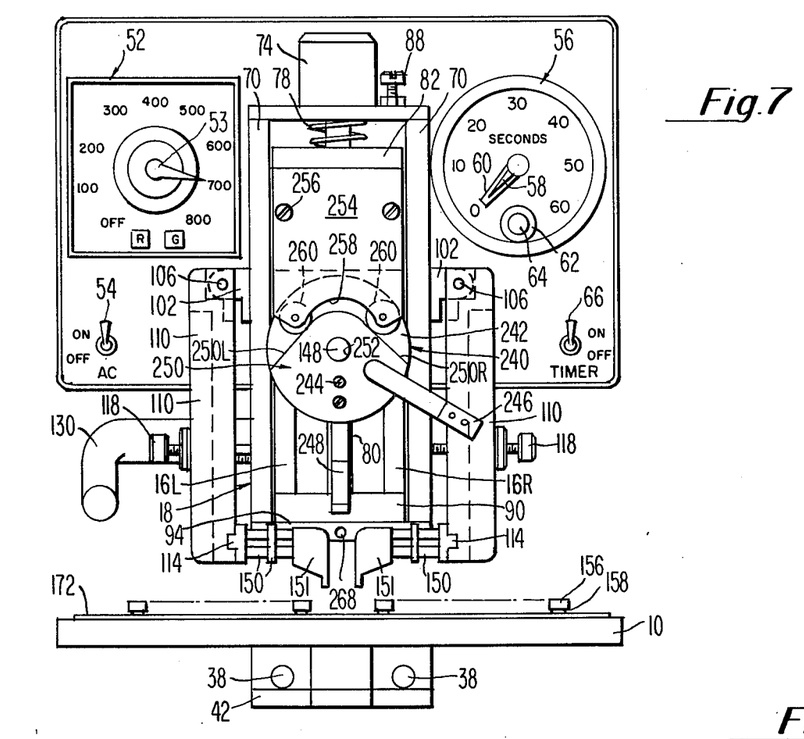
FIG. 7 is a view similar to FIG. 6 but with the apparatus moved to a different position.
Figure 10:
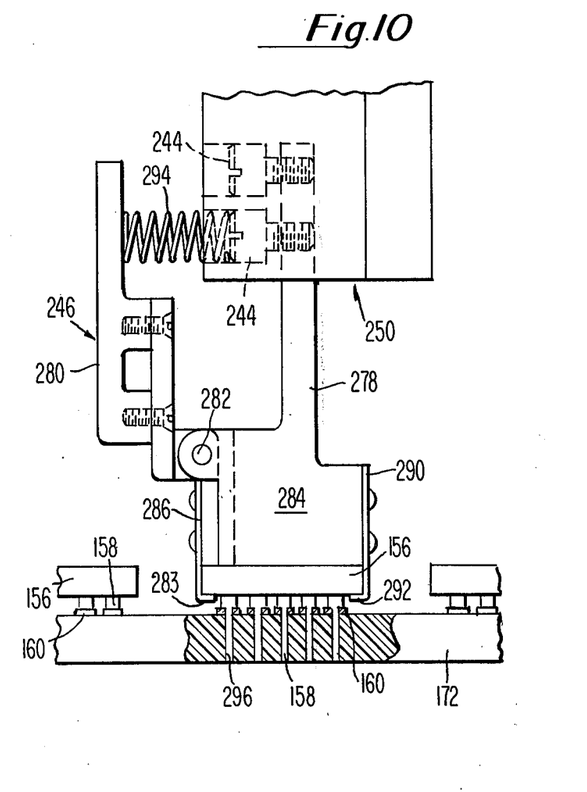
FIG. 10 is a view similar to FIG. 8 but with the chip pulling mechanism mounted on the apparatus ready for utilization.

Extractor-inserter tool 246, FIG. 10, comprises an attachment member 278 drilled as shown to receive mounting bolts 244 effective to secure member 246 to the tool holder 250 in the angular relationship shown in FIGS. 6 and 7. A chip release member 280 of heat insulating material is arcuately pivoted at 282 to the lower enlarged body portion 284 and carries a chip engaging element 286, the lower portion 288 of which is bent into a tang or gripper at right angles thereto, so as to project under the body of the DIP package or socket member 156. The opposite side of member 184 carries a fixed chip engaging gripper element 290 also bent into a tang 292 effective to engage the opposite end of the DIP package 156. A spring 294 retains the gripper 286 in tight engagement with the chip package 156 to that the chip can be removed from the PC board once the attachment material is loosened by means of the applied heat.

OPERATIONAL DESCRIPTION OF THE INVENTION

Figure 9:
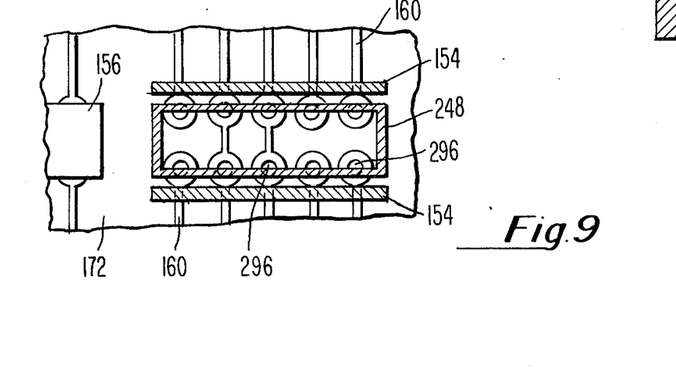
FIG. 9 is a view along the line 9—9 of FIG. 8.

The present invention is capable of extracting a chip or socket 156 and replacing such chip or socket with a new and/or different unit and/or removing or extracting a chip and then removing the excess attachment residue, i.e., solder, by blowing compressed air over line 270 from a source, now shown, through the PC board connection holes 296 as seen in FIG. 9.

Assume, in the first instance, that it is desired to remove a damaged or faulty chip from the PC board and to remove the residual solder from the holes in the board. An extractor-inserter tool 246 is bolted to the tool holder 250 and a desoldering tool 248 is attached to the holder 250 in the configuration shown most clearly in FIGS. 6 and 7. A PC board 172 carrying one or more D-I-P chips 156 is placed on the table 10 with the righthand extractor-inserter jaws clamped to the chip to be removed (see enlarged detail, FIG. 10).

The timer 56 (FIG. 6) is preset for the desired elapsed time, e.g., 10 seconds. The AC heater switch 54 is turned "on" and left on. The proportional temperature control 52 is set to the desired temperature. The red indicator light indicates low heat while the green indicator light indicates that the preset temperature has been reached and stabilized, e.g., 700° F. The time-blower switch 66 is set to on. The tool holder 250 is then inserted over the stud 148, handle 130 is depressed moving members 110, 114, 151, 70 and 74 downwardly from the position shown in FIG. 7 to that shown in FIG. 6, bringing the heater heads 151—151 and the integral projections 154—154 thereof, down on top of the solder pads straddling the chip 156 as seen in FIGS. 1, 6 and 11. The overtravel adjustment screw 88 is adjusted so that the heater heads rest on top of the PC pads with little or slight pressure thus to avoid warping or otherwise heat damaging the board.

Still holding handle 130 depressed, push button timer switch 64 is pressed inward to start timer 56 energizing heat lamp 68 for the preselected time interval. Air solenoid (not shown) for extract cylinder 20a (FIGS. 1, 2 and 3) is activated to retract cylinder 20 so that slot 194 (FIGS. 2 and 3) in member 195 is to the right of pin 192. At the end of the predetermined time, timer 56 switches "off" turning off heat lamp 68 and closing air solenoid to extract cylinder 20a concurrently activating relays 30 and 32. Relay 30 has a 1.5 second delay while relay 32 has a 2.5 second delay.

Relay 32 controls the air solenoid valve, not shown, that operates cylinder 22 in turn operates the solder deflector slide 24. Movement of slide 24 and cam 44 (leftwardly in FIGS. 1, 2 and 3 from the position of FIG. 2 to that of FIG. 3 raises link 222, rocking latch link 216 releasing latch 210 and 214. Tension spring 206 now contracts pivoting member 188 clockwise above pivot shaft 182. Member 180 slides leftwardly along shaft 78 rocking shaft 178 arcuately, upwardly, causing the bearing block 142 to strike or "tap" the member 138 in an upward direction, moving the block 134 upwardly a sufficient distance, e.g., about a quarter of an inch, effective to pull the desoldered chip 156 from the PC board 172.

When the chip component releases from the PC board as a result of the ¼ inch travel of block 134, member 188 pivots around shaft 182 sufficiently for cam 234 to close switch 28 which energizes the extract solenoid 20a causing rod 196 and link 194 under tension of spring 206 to pull member 188 rightwardly, FIG. 3, raising block 134 its full travel carrying the extract tool vertically upwardly. Upward movement of the extract block 134 raises cam 250 (FIG. 6) to a position to cause the left roller 260 to engage and slide over the left cam edge 250L, snap-rolling cam 250 from the position of FIG. 6 to the position of FIG. 7 with the cam 250 resting full against both rollers 260—260 of member 254. This motion rotates the extract tool rightwardly to position the extracted chip to the far right as seen in FIG. 7 and brings the left desolder tool holder 248 to a vertical position, as shown. Restoring motion of the apparatus will cause the rod 178 to move arcuately downwardly moving block 134 and the desolder tool holder 243 to the board 172.

When member 134 rises approximately ¼ inch this is sufficieint rotation of member 188 around pivot 182 to permit cam 234 to close microswitch 28 in circuit with relay 30. For the balance of the 1.5 second time relay 30 opens the air solenoid valve (not shown) for extract cylinder 20a completing the extract half cycle.

At the end of the 1.5 second delay, relay 30 switches, turning off air to extract cylinder 20a and at the same time activating relay 34 (1.5 second delay) that controls the air solenoid valve (not shown) to the return end 20b of cylinder 20. Forward movement of the piston rod 196 of FIG. 2, produces a counterclockwise rotation of member 188 about pivot 182 causing cam 232 on the opposite side of the apparatus to activate microswitch 26 opening air solenoid to solder blower solenoid 22. Compressed air from a source (not shown) is then blown through inlet 270, FIG. 3, into block 94 and through orifice 268, FIG. 5, into and through solder remover tool 248, FIG. 8, to remove residual solder from the connection holes 296 in PC board 172.

At this point relay 32 (2.5 seconds) switches turning off air to solder deflector slide mechanism and cylinder 22. At the end of three seconds (combined time of relays 30 and 32) relay 34 switches returning the apparatus to the start or home position.

If, at the end of the timed cycle, when member 142 strikes member 134 and member 134 does not raise ¼ inch this indicates that the chip component did not release from the PC board, for example, due to the temperature being too low to melt the solder, or the "heat time" being too short, or for some other inexplicable reason, member 188 will not have rocked rightwardly, (FIGS. 2 and 3) sufficiently far so as to cause cam 234 to close microswitch 28. Thus, cylinder 20 will not retract and at the end of 1.5 second relay 30 will switch and activate relay 34 to cause the apparatus to return to the starting position, FIG. 1. This effectively prevents damage to the PC board as well as to the chip.

When it is desired to remove a faulty chip and insert a new chip in its place, the physical operation of the apparatus is substantially identical to the foregoing except that the timer-solder blower override switch 66 is placed in the off position for obvious reasons and the tool holder 250 is provided with two extractor-inserter tools 246. The physical arrangement is the same as that shown in FIGS. 6 and 7. The second extractor-inserter tool 246 located on, and physically attached to, the left side of the holder 250. In this instance the compressed air is not utilized but otherwise the cycle of operation is the same as before.

There has thus been described a novel apparatus for easily, simply and efficiently inserting and/or removing dual in-line solid state chip devices and/or chip receiving socket members from printed circuit boards and the like.

What is claimed is:

1. Apparatus for removing and replacing dual in-line solid state chips and like devices relative to printed wiring assemblies such as printed circuit boards, comprising:
    a first heat source, said first heat source comprising oppositely disposed heater elements, means to position said elements so that said elements straddle an individual chip effective when said heater elements are activated to release said chip from said board;
    a second heater source adjacent said first heat souce;
    means to position a printed circuit board between said first and second heat sources;
    means for energizing said first and second heat sources effective to release the attachment means securing said chips to said board; and
    cyclically operable means operably associated with said means to position the printed circuit board for detaching and removing a chip from said board upon release of the attachment means.

2. The invention in accordance with claim 1 wherein said means to position said printed circuit board comprises a demountable cam actuated work piece holder, means mounting said work piece holder adjacent to said printed circuit board permitting the work piece holder to grip said chip, means for reciprocably moving said work piece holder effective upon release of said chip detaching means to detach said chip from said board.

3. The invention in accordance with claim 2 wherein said work piece holder further includes cam means operably engageable with follower means for moving said work piece holder to a position enabling said work piece holder to insert a new chip into the position vacated by the removed chip.

4. Apparatus for removing and replacing dual in-line solid state chips and like devices relative to printed wiring assemblies such as printed circuit boards, comprising:
    a first heat source;
    a second heat source adjacent said first heat source;
    said second heat source comprising a high heat radiant energy means arranged to focus the heat output therefrom onto said printed circuit board effective when said energy source is energized to release the chip securing attachment means thereby releasing said chip for removal and extraction from said board;
    means to position a printed circuit board between said first and second heat sources;
    means for energizing said first and second heat sources so as to release the attachment means; and
    cyclically operable means operably associated with said means to position the printed circuit board for detaching and removing a chip from said board upon release of the attachment means.

5. Apparatus for removing and replacing dual-in-line solid state chips and like devices relative to printed wiring assemblies such as printed circuit boards comprising,
    a pair of parallel oriented heater members arranged to straddle a chip on one side circuit board assembly,
    a radiant energy heat source arranged to focus the heat energy against the attachment means of said chip on the opposite side of said printed wiring board,
    means to position said printed circuit chip carrying board between said parallel heater members,
    means for energizing said parallel heater members and said radiant energy heat source effective to release the attachment securing said chip to said board,
    cyclically operable means including a chip carrying workpiece holder operably engageable with said positioning means for detaching said chips and removing the same from said board, and
    means preventing the extraction of a chip from said board upon failure of the release of the chip attaching means.

6. The invention in accordance with claim 5 wherein said radiant energy heat source is adjustably positionable relative to said printed circuit board assembly so as to bring the focus of said energy adjacent to the chip attachment means effective to cause the chip attachment means to release upon energization of said heat energy source.

7. The invention in accordance with claim 6 wherein said radiant energy heat source is coupled to means for controllably timing the energization thereof in accordance with a preselected time sequence.

8. The invention in accordance with claim 5 wherein said means for preventing the extraction of a chip from said board comprises cam actuated switch means operably associated with said chip detaching means effective to cancel said chip extraction operation thereby avoiding damage to the chip and/or the board.

9. The invention in accordance with claim 5 wherein said means to position said printed circuit board between said heater means further comprises means mounting a chip inserting member and an attachment removal member thereon, said attachment removal member including means for forcing pressurized air into and through the apertures vacated by the chip connecting lugs effective to clear the printed circuit board of any attachment residue preparatory to receiving a fresh chip thereon.

10. The invention in accordance with claim 5 wherein said cyclically operable means operably engageable with said positioning means includes a first multiposition air actuated ram having spring return means for repositioning said ram, a second air actuated ram including latch means for cocking said chip detaching means in a home position, switch means controlling said heater means whereby upon release of said chip attachment means said latch is released enabling said first ram means to partially pull said chip from said board and upon chip release therefrom to enable said spring return means to totally remove said chip and position the chip carrying work piece holder to one side for insertion of a new chip.

* * * * *

UNITED STATES PATENT OFFICE
CERTIFICATE OF CORRECTION

Patent No. 4,022,370  Dated May 10, 1977

Inventor(s) David John Durney

It is certified that error appears in the above-identified patent and that said Letters Patent are hereby corrected as shown below:

Col. 1, line 39, "ar" should read -- are --.

Col. 2, line 22, "wich" should read -- which --.

Col. 3, line 13, "on" should read -- one --.

Col. 5, line 14, "melting" should read -- remelting --,
      line 31, delete "151-152" and insert -- 151-151. Electrical resistance elements 152-152 --.

Col. 7, line 17, "176" should read -- surface 276 --.

Col. 8, line 55, "sufficieint" should read -- sufficient --.

Signed and Sealed this second Day of August 1977

[SEAL]

Attest:

RUTH C. MASON  
Attesting Officer

C. MARSHALL DANN  
Commissioner of Patents and Trademarks